United States Patent [19]

Ueda

[11] Patent Number: 5,265,226

[45] Date of Patent: Nov. 23, 1993

[54] MEMORY ACCESS METHODS AND APPARATUS

[75] Inventor: Tomoaki Ueda, Kyoto, Japan

[73] Assignee: Daikin Industries, Ltd., Japan

[21] Appl. No.: 633,350

[22] Filed: Dec. 27, 1990

[30] Foreign Application Priority Data

Dec. 27, 1989 [JP] Japan ............... 1-344448

[51] Int. Cl.⁵ .............................. G06F 7/58
[52] U.S. Cl. .................. 364/574; 395/425; 364/DIG. 1; 364/581
[58] Field of Search .............. 395/400, 425; 364/200 MS File, 900 MS File, 572, 574, 581

[56] References Cited

U.S. PATENT DOCUMENTS

| | | | |
|---|---|---|---|
| 4,023,026 | 5/1977 | O'Farrell | 235/152 |
| 4,045,796 | 8/1977 | Kline, Jr. | 343/6.5 |
| 4,567,588 | 1/1986 | Jerrim | 370/18 |
| 4,875,021 | 10/1989 | Sonetaka | 331/78 |
| 4,972,480 | 11/1990 | Rosen | 380/46 |
| 5,031,130 | 7/1991 | Harada | 364/717 |

OTHER PUBLICATIONS

J. E. Weaver, Probability of Data Error in Holographic Storage in Electro-Optic Crystals, Proceedings of the Society of Photo-Optical Instrumentation Engineers, Optical Information Storage, Washington, U.S.A., pp. 82-88, Apr. 17-18, 1977.

E. F. Deprettere and P. Kroon, Compression and Quantization of Speech, Tijdschrift Van Het Nederlands Electronica- En Radiogenootschap, vol. 49, No. 2, pp. 33-38, 1984.

Primary Examiner—Joseph L. Dixon
Assistant Examiner—Frank J. Asta
Attorney, Agent, or Firm—Beveridge, DeGrandi, Weilacher & Young

[57] ABSTRACT

A method of regenerating data convolutes plural data using maximal-sequence codes phase shifted by individual quantities and writes the convoluted data into a cyclic memory. A data regeneration apparatus reads out a desired data from the cyclic memory using a corresponding maximal-sequence code. Another method of regenerating data convolutes plural data using sequence codes for which are obtained weighting factors and maximal-sequence codes phase shifted by individual quantities and writes the convoluted data into a cyclic memory. Another data regeneration apparatus reads out a desired data from the cyclic memory using a corresponding maximal-sequence code. Still another method of regenerating data method convolutes plural data using maximal-sequence codes phase shifted by individual quantities and writes the convoluted data into a cyclic memory. Still another data regeneration apparatus reads out desired data from the cyclic memory using sequence codes which are obtained by weighting factors and maximal-sequence codes phase shifted quantities by individual.

34 Claims, 12 Drawing Sheets

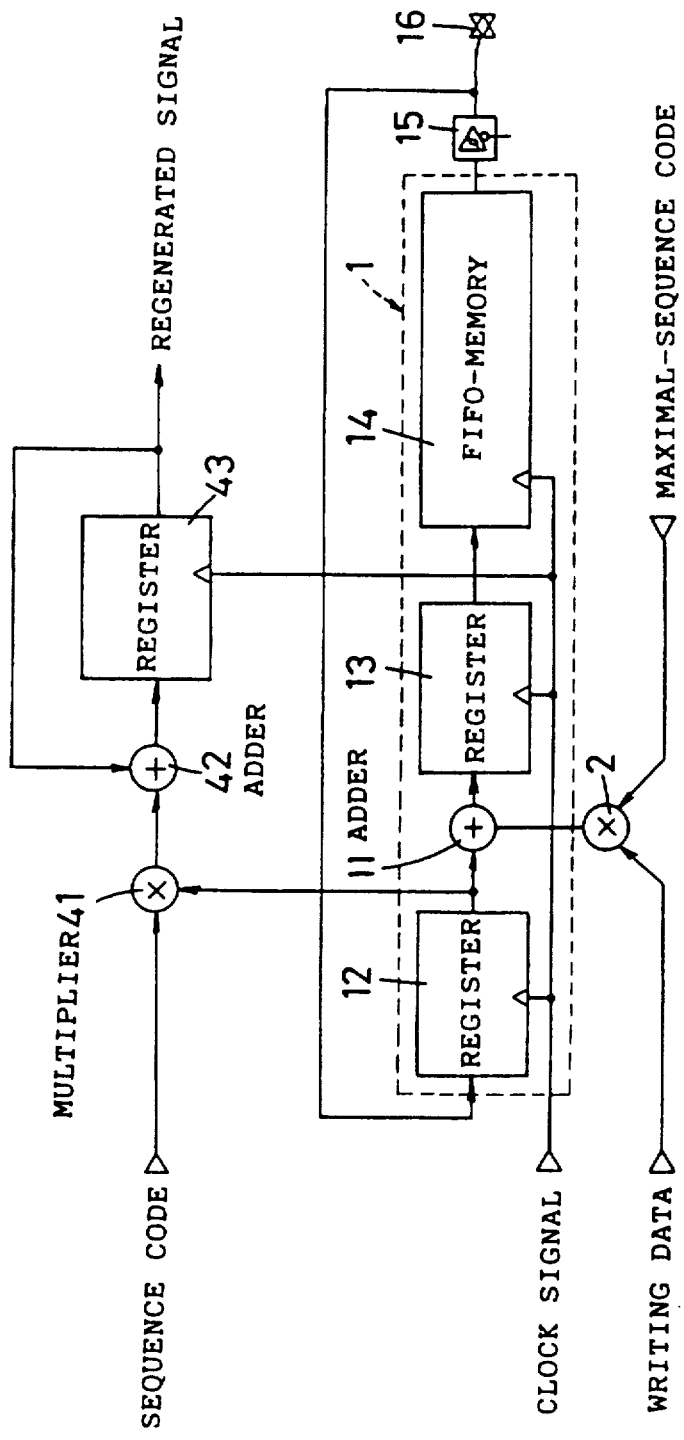

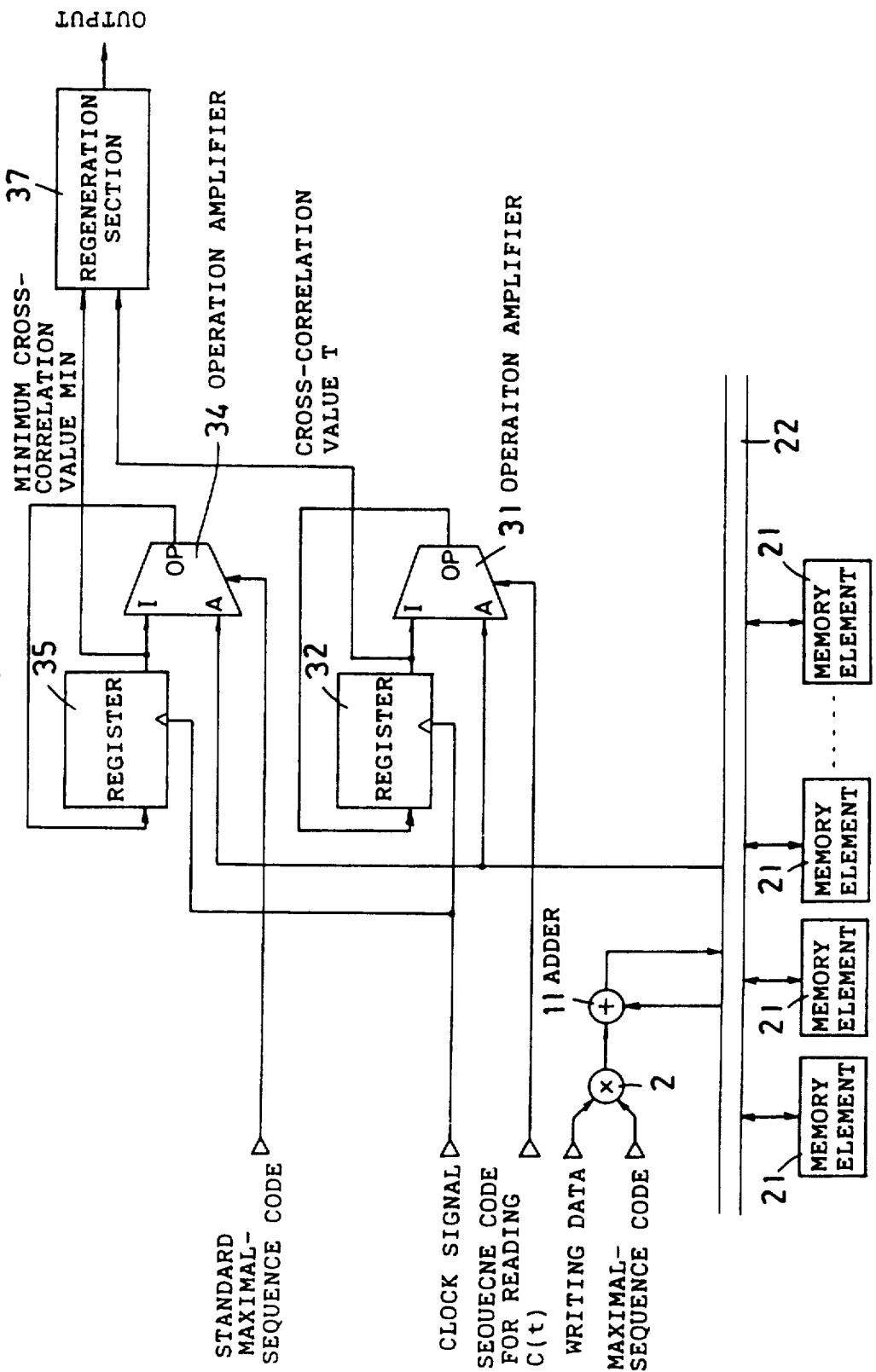

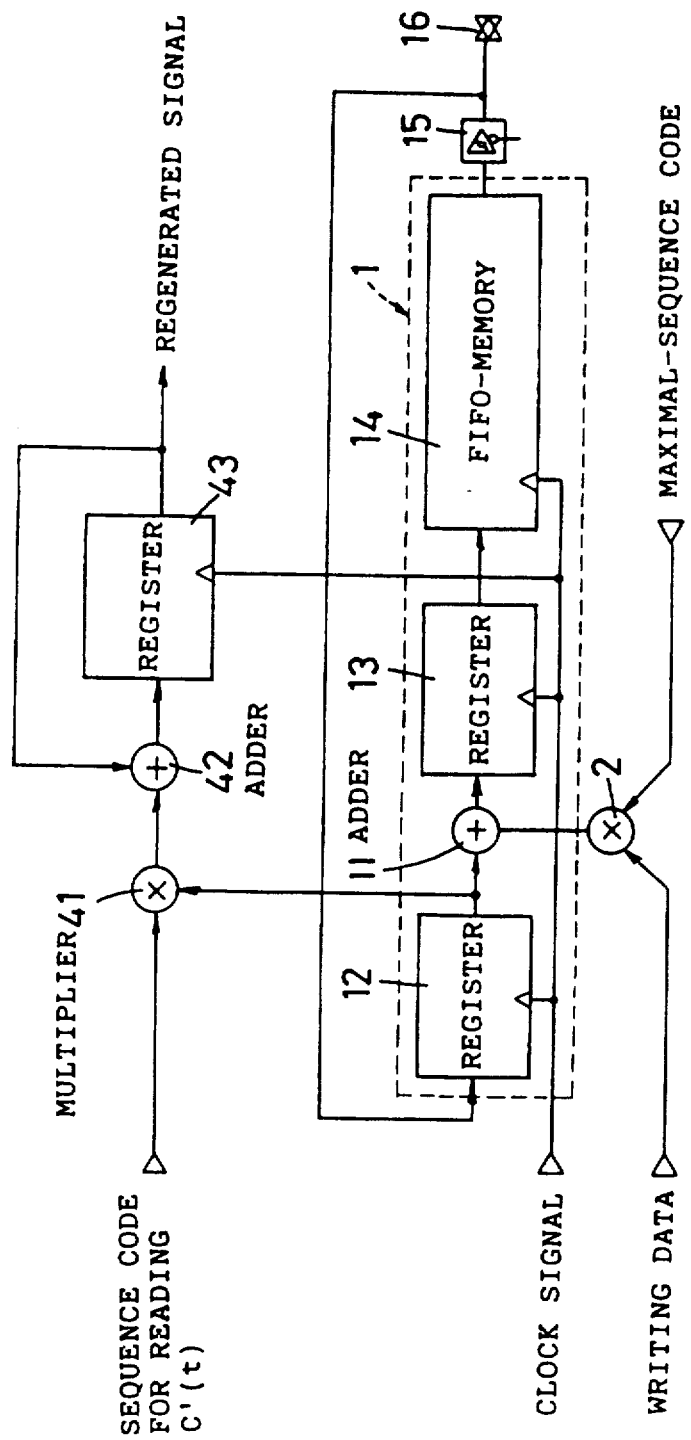

MEMORY ACCESS METHODS AND APPARATUS

BACKGROUND OF THE INVENTION

The present invention relates to "memory access" or "data regeneration" methods and apparatus, and more particularly, to novel methods and apparatus for storing plural data within a predetermined range of a memory with electrically diffusing each data and convoluting each electrically diffused data.

With conventional systems, for example computer systems, robot control systems and the like, a memory and a memory access apparatus are widely employed to suit the demand for storing a very large quantity of data.

A magnetic memory device such as a magnetic tape, magnetic disc and bubble memory and a semiconductor memory device such as a bucket brigade device and a charge coupled device are widely employed as the memory because these devices have the advantages that a large memory capacity can easily be obtained and that writing into, reading out and erasing of data can easily be performed, and the like.

A data storing system for the memory devices stores specific data at a specific address of the memory device. The disadvantages that arise are that an average retrieval time for reading desired data out from the memory is lengthened, and processing speed of the system as a whole is lowered further as a result of increasing quantities of data which are storted in the memory device. The disadvantage that also arises is that data in a partial region of the memory device cannot be regenerated when the partial region of the memory device is destroyed because specific data is stored at a specific address of the memory device.

It is known that an error correction code is added to a series of data for regenerating partial data when the partial data are damaged. When the number of bits which are to be corrected is increased, the error correction code is lengthened. As a result, the disadvantage that arises is that the quantity of data which are stored in the memory is decreased. When the number of bits which are to be corrected is increased, the error correction processing becomes, complicated. As a result, the disadvantage that also arises is that the processing speed of the system as a whole is lowered.

A hologram memory is proposed which stores a large quantity of data as holograms by applying Fourier transformation, optically. When the hologram memory is employed, redundancy of the stored information can be increased so as to regenerate the original data with fairly high accuracy when the stored information is partially damaged. But the disadvantage that arises is that not only a laser beam source having strong output power is required, but also transforming circuitry for transforming light signals to electric signals and vice versa are needed so as to complicate the arrangement of the system as a whole, and to result in a higher cost.

SUMMARY OF THE INVENTION

It is an object of the present invention to store plural data in a predetermined region of a memory device in an electrically diffused and convoluted manner.

A memory access method according to the present invention comprises the steps of:

obtaining plural pseudo noises for writing by applying phase shifting to pseudo noise which has significant auto-correlation characteristics, each pseudo noise for writing being phase shifted by an individual quantity;

modulating each pseudo noise for writing based upon plural data;

writing the modulated pseudo noises into a cyclic memory means which has a capacity corresponding to a code length of the pseudo noise;

reading out the modulated pseudo noises from the cyclic memory means; and regenerating original data by obtaining a cross-correlation value between the modulated pseudo noises read out from the cyclic memory means and a pseudo noise phase shifted by a quantity corresponding to the individual quantity.

When this memory access method is employed, each data is electrically diffused by modulating the pseudo noise having phase shifting applied with a corresponding quantity based upon the data. And all data are written into the cyclic memory means, which has the capacity corresponding to the code length of the pseudo noise, by convoluting all modulated pseudo noises. Thereafter, the original data is regenerated by obtaining a cross correlation value between the modulated pseudo noises read out from the cyclic memory means and a pseudo noise having phase shifting applied with a corresponding quantity.

As is apparent from the foregoing, all data are stored in the cyclic memory means in an electrically diffused condition to the entire extent of the cyclic memory means by the pseudo noises, thereby data is maintained with high secrecy of and data are regenerated despite of damage to the cyclic memory means to some degree.

Another memory access method according to the present invention comprises the steps of;

obtaining plural pseudo noises for writing by applying phase shifting to a pseudo noise which has significant auto-correlation characteristics, each pseudo noise for writing being phase shifted by an individual quantity;

modulating each pseudo noise for writing based upon the plural data;

writing the modulated pseudo noises into a cyclic memory means which has a capacity corresponding to a code length of the pseudo noise;

reading out the modulated pseudo noises from the cyclic memory means; and obtaining weighted data by obtaining a cross-correlation value between the modulated pseudo noises read out from the cyclic memory means and a time sequence code which is obtained based upon weighting factors for each data and the plural pseudo noises.

When this memory access method is employed, the weighted data is obtained by obtaining a cross correlation value between the modulated pseudo noises read out from the cyclic memory means and the time sequence code which is obtained based upon the weighting factors and the plural pseudo noises.

This memory access method easily obtains cross-correlation results for the original data stored therein with weighting factors.

A further memory access method according to the present invention comprises the steps of;

obtaining plural pseudo noises by applying phase shifting to a pseudo noise which has significant auto-correlation characteristics, each pseudo noise being phase shifted by an individual quantity;

obtaining a time sequence code based upon weighting factors for each data and the plural pseudo noises;

modulating the time sequence code based upon the plural data to obtain modulated time sequence codes;

writing the modulated time sequence codes into a cyclic memory means which has a capacity corresponding to a code length of the pseudo noise;

reading out the modulated time sequence codes from the cyclic memory means; and obtaining weighted data by obtaining a cross-correlation value between the modulated time sequence codes read out from the cyclic memory means and a pseudo noise phase shifted by a quantity corresponding to the individual quantity.

When this memory access method is employed, each weighted data is electrically diffused by modulating the time sequence code which is obtained based upon weighting factors for each data and the plural pseudo noises with each data, then all weighted data are written into the cyclic memory means having the capacity corresponding to the code length of the pseudo noise by convoluting all modulated time sequence codes. Thereafter, the modulated time sequence codes are read out from the cyclic memory means and the weighted data is obtained by obtaining cross-correlation value of the modulated time sequence codes with the pseudo noise having phase shifting applied with a corresponding quantity.

This memory access method stores convolution data which are obtained by convoluting weighting factors with the original data.

It is preferable that the plural data to be rewritten are differences between new writing data and data already written in the cyclic memory means when the new writing data are to be written into the cyclic memory means.

When this memory access method is employed, it is sufficient to establish the differences as writing data merely, renewal of data is easily performed.

It is also preferable that the pseudo noise is a maximal-sequence code. In this case, the maximal-sequence code must have a code length longer than a total length of the plural data.

When a maximal-sequence code is employed as a pseudo noise, a pseudo noise having a code length corresponding to a number of stages of the cyclic memory means can easily be obtained. Therefore, a change in the number of stages of the cyclic memory means can easily be dealt with.

It is further preferable that the plural data include a standard data and intermediate value data and the original data other than the standard data is regenerated based upon the regenerated standard data.

When this method is employed, intermediate value data are regenerated based upon the regenerated standard data.

A memory access apparatus according to the present invention comprises;

pseudo noise generating means for generating plural pseudo noises for writing based upon a pseudo noise having significant auto-correlation characteristics, the plural pseudo noises for writing being phase shifted by individual quantities;

modulation means for modulating the plural pseudo noises for writing based upon plural data to provide modulated pseudo noises;

convolution means for convoluting the modulated pseudo noises to provide convoluted signal data;

cyclic memory means for sequentially storing the convoluted signal data, the cyclic memory means having a capacity corresponding to a code length of the pseudo noise;

read out means for reading out the convoluted signal data from the cyclic memory means;

cross-correlation means for obtaining a cross-correlation value between the convoluted signal data read out from the cyclic memory means and a pseudo noise phase shifted by a quantity corresponding to the individual quantity; and regeneration means for regenerating the plural data based upon the cross-correlation value.

When this memory access apparatus is employed, each pseudo noise is modulated by the modulation means with each data, each pseudo noise having phase shifting applied with a corresponding quantity, then all modulated pseudo noises are convoluted by the convolution means and the convoluted signal data is stored in the cyclic memory means. Thereafter, the convoluted signal data is read out from the cyclic memory means by the read out means, then the original data is regenerated and output therefrom by obtaining cross-correlation value between the convoluted signal data read out from the cyclic memory means and a pseudo noise having phase shifting applied with a corresponding quantity.

As is apparent from the foregoing, data are maintained with high secrecy because all data are electrically diffused by the pseudo noises and stored within the whole stage of the cyclic memory means, and the original data can be regenerated despite of damage to the cyclic memory means, to some degree.

Another memory access apparatus according to the present invention comprises;

pseudo noise generating means for generating plural pseudo noises for writing based upon a pseudo noise having significant auto-correlation characteristics, the plural pseudo noises for writing being phase shifted by individual quantities;

modulation means for modulating the plural pseudo noises for writing based upon plural data to provide modulated pseudo noises;

convolution means for convoluting the modulated pseudo noises to provide convoluted signal data;

cyclic memory means for sequentially storing the convoluted signal data, the cyclic memory means having a capacity corresponding to a code length of the pseudo noise;

read out means for reading out the convoluted signal data from the cyclic memory means;

cross-correlation means for obtaining a cross-correlation value of the read out signals with a time sequence code which is obtained based upon weighting factors for each data and the plural pseudo noises; and generation means for generating plural weighted data based upon the cross-correlation value.

When this memory access apparatus is employed, the weighted data is obtained by obtaining the cross correlation value between the convoluted signal data read out from the cyclic memory means and the time sequence code which is obtained based upon the weighting factors and the plural pseudo noises.

This memory access apparatus easily obtains correlation results for the original data stored therein with weighting factors.

A further memory access apparatus according to the present invention comprises;

pseudo noise generating means for generating plural pseudo noises based upon a pseudo noise having significant auto-correlation characteristics, the plural pseudo noises being phase shifted by individual quantities;

time sequence code generating means for generating a time sequence code based upon weighting factors for each data which is to be stored and the pseudo noises;

modulation means for modulating the time sequence code based upon the plural data which are to be stored to provide modulated time sequence codes;

convolution means for convoluting the modulated time sequence codes to provide convoluted signal data;

cyclic memory means for sequentially storing the convoluted signal data, the cyclic memory means having a capacity corresponding to a code length of the pseudo noise;

read out means for reading out the convoluted signal data from the cyclic memory means;

cross-correlation means for obtaining and outputting a cross-correlation value of the read out signals with pseudo noise phase shifted by quantities corresponding to the individual quantity; and generation means for generating plural weighted data based upon the cross-correlation value.

When this memory access apparatus is employed, each weighted data is electrically diffused by modulating the time sequence code which is obtained based upon weighting factors for each data and the plural pseudo noises with each data, then all weighted data are written into the cyclic memory means having the capacity corresponding to the code length of the pseudo noise by convoluting all modulated time sequence codes. Thereafter, the convoluted signal data are read out from the cyclic memory means and the weighted data is obtained by obtaining the cross-correlation value between the convoluted signal data and the pseudo noise having phase shifting applied with a corresponding quantity.

This memory access apparatus stores convolution data which are obtained by convoluting weighting factors to the original data.

It is preferable that the convolution means convolutes new writing data and data already written in the cyclic memory means.

When this memory access apparatus is employed, renewal of data is easily performed.

It is also preferable that the pseudo noise is a maximal-sequence code. In this case, the maximal-sequence code must have a code length longer than a total length of the plural data.

When a maximal-sequence code is employed as a pseudo noise, a pseudo noise having a code length corresponding to the number of stages of the cyclic memory means can easily be obtained. Therefore, a change in the number of stages of the cyclic memory means can easily be dealt with.

It is further preferable that the plural data include a standard data and intermediate value data and the regeneration means includes restoration means for restoring data other than the standard data based upon the regenerated standard data.

When this apparatus is employed, intermediate value data are regenerated based upon the regenerated standard data.

It is still further preferable that the cyclic memory means includes two stages of registers, an adder interposed therebetween and plural stages of first-in first-out memory.

It is also preferable that the cross-correlation means includes a register, an operational amplifier for performing predetermined operations based upon the content of the register, the received data and a maximal-sequence code to obtain operation results and for supplying the operation result to the register, and the regeneration means is an inverter for outputting regeneration data based upon the uppermost digit of the register.

It is further preferable that the cross-correlation means includes a multiplier for multiplying the pseudo noise phase shifted by quantities corresponding to the individual quantities with read out pseudo noise, an adder and a register, wherein output data from the adder is supplied to the register and output data from the register is output as regeneration data and is supplied to the adder together with output data from the multiplier.

It is also preferable that the cross-correlation means includes a register, and an operational amplifier for performing predetermined operations based on the content of the register, the received data and a maximal-sequence code to obtain operation results and for supplying the operation result to the register.

It is further preferable that the cross-correlation means includes a multiplier for multiplying the pseudo noise phase shifted by quantities corresponding to the individual quantities with read out pseudo noise, an adder and a register, wherein output data from the adder is supplied to the register and output data from the register is output as regeneration data and is supplied to the adder together with output data from the multiplier.

It is of course possible that pseudo noises having significant auto-correlation characteristics other than the maximal-sequence code are employed.

More specifically, a maximal-sequence code is the longest code sequence which can be generated by shift registers having a predetermined number of stages or a feedback code generator made of delay devices, and is so called the maximal periodic sequence or the longest sequence. The maximal-sequence code may be in the form of a modulo-j code where j is an arbitrary number; a binary system code is used in the following explanation. The binary system code has the following characteristics:

(1) The difference between the number of appearances of "0" and the number of appearances of "1" within one period of a series is only 1 bit. That is, when a binary system code having a bit length of $2^n-1$ is employed, the number of appearances of "1" is $2^{n-1}$, while the number of appearances of "0" is $2^{n-1}-1$. Concretely, when n=3, the binary system code is "1 0 1 1 1 0 0" for example, and the number of appearances of "1" is greater than that of "0" by 1.

(2) The statistical distribution of "0" and "1" is constant. The relative position of strings of "0" and "1" vary depending on the binary system code, but the number of appearances of a string having a predetermined length is constant for all binary system codes which have the same bit length.

(3) Referring to FIG. 9, the auto-correlation value of the binary system code is $2^n-1$ (which is equal to the bit length) for 0 bit shift, while the auto-correlation value of the binary system code is $-1$ for an arbitrary number of bit shifts other than the bit shift range of $0\pm 1$. The auto-correlation value of $-1$ is obtained by counting the number of coincidence portions, and the value of $-1$ indicates that the number of dissonances is greater than the number of coincidences by 1. Further, the auto-correlation value varies linearly from $-1$ to $2^n-1$ within the bit shift range of $0\pm1$.

(4) Summation with a modulo-2 of an original binary system code and a phase shifted original binary system code with a predetermined phase shifting quantity is another phase shifted original binary system code which phase shifting quantity is different from the predetermined phase shifting quantity.

(5) All inner states which are able to be obtained by an n-step shift register generator appear in a binary system code at a predetermined clock time within one period. That is, each inner state appears only one time, and within only one clock time.

It is widely known that noise has significant auto-correlation characteristics and the auto-correlation values of noise are negligible when noise is shifted slightly. The maximal-sequence code can be used as a pseudo noise because the maximal-sequence code has a characteristic similar to the characteristic mentioned above, following the lengthening of the bit length.

The inventor advanced the research for pseudo noise represented by maximal-sequence codes and found new characteristics as follows:

When the code of "0" in maximal-sequence codes is replaced with the code of "$-1$", cross-correlation of a standard maximal-sequence code with a serial code which is obtained by adding plural maximal-sequence codes, each maximal-sequence code being obtained by phase shifting the standard maximal-sequence code by an individual phase, is the same as a sum of cross-correlations of the standard maximal-sequence code with an individual maximal-sequence code.

The difference between the peak value and the lowest value of the cross-correlation is a constant value which is determined based upon the bit length of the maximal-sequence code, despite the varying of the peak value and the lowest value of the cross-correlation in correspondance with the addition number of the maximal-sequence codes.

The inventor worked out this present invention based on the findings.

When a standard maximal-sequence code "1 0 1 1 1 0 0" having a bit length of $2^3-1$, shown in FIG. 8-A1, is taken into consideration for example, maximal-sequence codes which are phase shifted with $+1$ bit, $+2$ bits and $+4$ bits are "0 1 0 1 1 1 0", "0 0 1 0 1 1 1" and "1 1 0 0 1 0 1" (refer to FIGS. 8-B1, 8-C1 and 8-D1). A sequence code which is obtained by adding the maximal-sequence codes phase shifted with $+1$ bit, $+2$ bits and $+4$ bits respectively, is shown in FIG. 8-E1. When cross-correlation of these sequence codes with the standard maximal-sequence code is obtained, peaks having the same value as the peak of the auto-correlation (refer to FIG. 8-A2) are obtained respectively at the phase shifted position with $+1$ bit, $+2$ bits and $+4$ bits (refer to FIGS. 8-B2, 8-C2 and 8-D2) with respect to the auto-correlation for the maximal-sequence codes which are phase shifted with $+1$ bit, $+2$ bits and $+4$ bits. Furthermore, peaks having a lower value than the peak of the auto-correlation shown in FIG. 8-A2 are obtained at every phase shifted position with $+1$ bit, $+2$ bits and $+4$ bits (refer to FIG. 8-E2) with respect to the auto-correlation for the convoluted sequence codes when the cross-correlation of the sequence code shown in FIG. 8-E1 with the standard maximal-sequence code is obtained. The peak value of the cross-correlation shown in FIG. 8-E2 is 5, and is lower than the peak values 7 ($=2^3-1$) of the cross-correlation shown in FIGS. 8-B2, 8-C2 and 8-D2 by 2. The value at a position apart from the peak by more than 1 bit is $-3$ in FIG. 8-E2, while each value at positions apart from the peak by more than 1 bit is $-1$, as shown in FIG. 8-B2, 8-C2 and 8-D2. The former value $-3$ is lower than the latter values $-1$ by 2. That is, cross-correlation which is the same as the cross-correlation shown in FIG. 8-E2 is obtained by simply adding the cross-correlations shown in FIGS. 8-B2, 8-C2 and 8-D2. The difference between the maximum value and the minimum value is 8 ($=2^3$) for all cross-correlations. Furthermore, when maximal-sequence codes which are phase shifted with 0 bit to $+6$ bits respectively are added, the peak value of the cross-correlation is 1. The peak value never becomes negative despite varying of the peak value in correspondance with the number of maximal sequence codes to be added.

This present invention is made based on the findings mentioned above. Each data is used to modulate the pseudo noise which is obtained by applying phase shifting with predetermined phase to a pseudo noise having significant auto-correlation characteristics and the modulated pseudo noises are convoluted and written into the cyclic memory means, thereby all data are electrically diffused and stored in the cyclic memory means. When desired data are to be regenerated, the convoluted signal is read out from the cyclic memory means, then the cross-correlation value is obtained based upon the read out convoluted signal and the pseudo noise corresponding to the desired data, thereafter, the original data is regenerated based upon the cross-correlation value. Also, data applying weighting to each data may be stored in the cyclic memory means and the weighted data may be regenerated or obtained.

The above, and other objects, features and advantages of this invention will be apparent from the following detailed description of illustrative embodiments which is to be read with the accompanying drawings.

BRIEF DESCRIPTION OF THE DRAWINGS

FIGS. 4, 5, 6(A), 6(B), 6(C), 7(A), 7(B), and 7(C) are block diagrams of further embodiments of the memory access apparatus in accordance with the present invention, respectively;

DETAILED DESCRIPTION OF THE PREFERRED EMBODIMENTS

Figure 1:
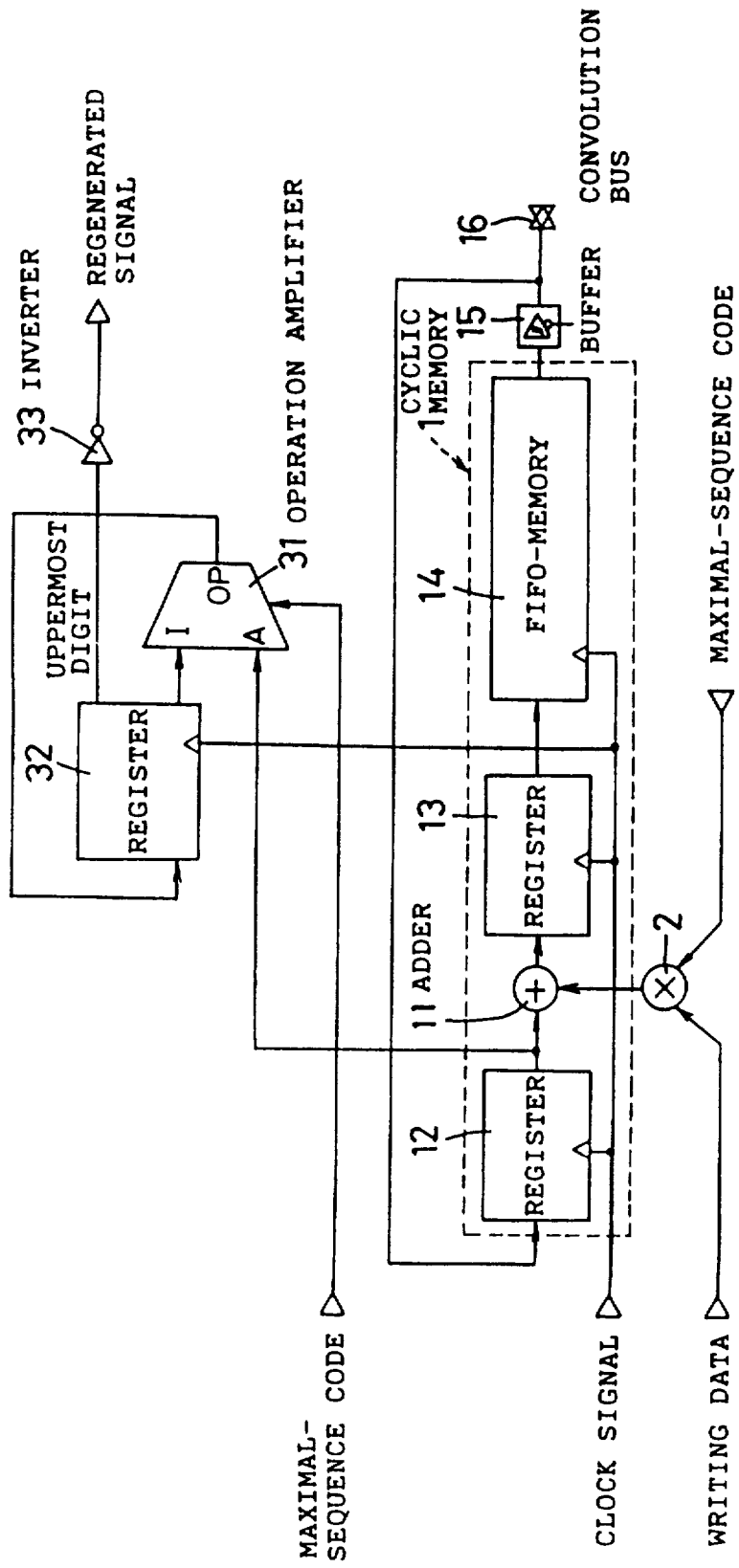
FIG. 1 is a block diagram of an embodiment of the memory access apparatus in accordance with the present invention.

FIG. 1 is a block diagram of an embodiment of the "memory access" or "data regeneration" apparatus in accordance with the present invention.

This memory access apparatus is arranged to store data in a diffused condition in a cyclic memory 1 and to read out data therefrom. The cyclic memory 1 has two stages of registers 12 and 13, an adder 11 interposed therebetween and ($2^n-3$) stages of FIFO-memory (first-in first-out memory) 14. The reference numeral 15 indicates a bus buffer and the reference numeral 16 indicates a convolution bus. The registers 12 and 13 and the FIFO-memory 14 are supplied by a common timing clock.

Writing data and a maximal-sequence code $m(t+j\Delta T)$ (where j is an integer less than the number of bits of the maximal-sequence code) as a pseudo noise for writing are supplied to a multiplier 2. The output data from the multiplier 2 is supplied to the adder 11. The output data from the register 12 is supplied to one input terminal A of an operation amplifier 31 while contents of a register 32 are supplied to another input terminal I of the operation amplifier 31 which also is supplied with a maximal-sequence code $m(t+j\Delta T)$ as a pseudo noise for reading, which code acts as a control signal. The operation result output from the output terminal OP of the operation amplifier 31 is fed back to the register 32. The uppermost digit from the register 32 is output as a regenerated signal through an inverter 33. The operation amplifier 31 is arranged to output the operation result in the form of a compliment of 2 and to perform an operation of $OP=I+A$ when the maximal-sequence code is "1" otherwise to perform an operation of $OP=I-A$. The register 32 is arranged to output the uppermost digit and to be cleared to 0 at every clock signal supplying timing, the number of clock signals being equal to the number of bits of the maximal-sequence code.

Figure 2:
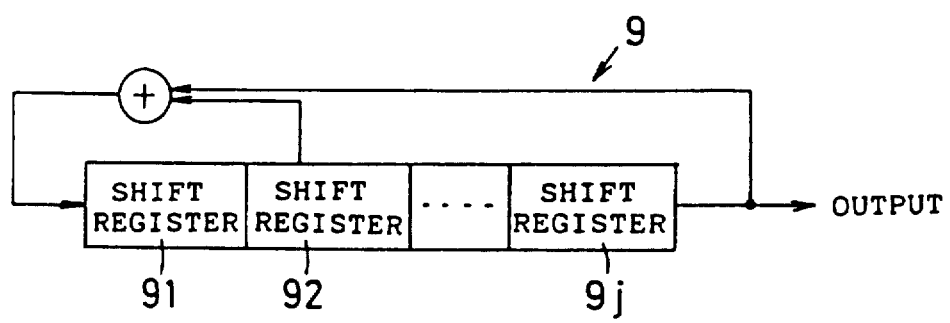
FIG. 2 is a block diagram showing an arrangement of an apparatus for generating a maximal-sequence code.

FIG. 2 is a block diagram showing an arrangement of an apparatus 9 for generating a maximal-sequence code.

A number j of shift registers 91, 92 . . . 9j are serially connected, and the output data from the shift register 9j of the output stage and output data from the shift register of a predetermined stage are applied to an exclusively logical add operation to obtain an exclusively logical add result. The exclusively logical add result is then supplied to the shift register 91 of the first stage. The number j of stages of the shift registers is determined as $2^j - 1 \geq L$ (where L is a number of writing data), and the exclusively logical add result based upon the shift register of the predetermined stage (predetermined tap position) is fed back to the shift register of the first stage so as to repeat the same bit pattern with a cycle of $2^j - 1$ times. Further, a conversion circuit (not shown) is provided for converting the "0" level of the binary data output from the shift register 9j of the output stage to the "−1" level.

Operations of the memory access apparatus are as follows.

(1) Operations for writing data in the cyclic memory 1:

When data is to be written into the cyclic memory 1 having two stages of registers 12 and 13 and $(2^n-3)$ stages of FIFO-memory 14, it is sufficient that writing data and the maximal-sequence code $m(t+j\Delta T)$ as a pseudo noise for writing are supplied to the multiplier 2. Then, the output data from the multiplier 2 and the output data from the register 12 are added by the adder 11 and the addition result is supplied to the register 13. At this timing, data held by the register 13 is supplied to the first stage of the FIFO-memory 14, data held by the FIFO-memory 14 are shifted by every one stage and data held by the output stage of the FIFO-memory 14 are supplied to the register 12 through the bus buffer 15. Data is then written into the cyclic memory in a diffused condition to $(2^n-1)$ bits by repeating the above mentioned operations by 1 period of the maximal-sequence code.

When plural data are to be written into the cyclic memory 1, it is sufficient that operations similar to the above mentioned operations are performed using a maximal-sequence code having phase shifting applied with different phase shifting quantities, thereby plural data are written into the cyclic memory 1 in a diffused to $(2^n-1)$ bits and convoluted condition.

It is supposed that the binary logic input data "1", "1", "0" and "1" are to be sequentially written into the cyclic memory 1.

Maximal-sequence codes "−1 1−1 1 1 1 −1", "−1 −1 1 −1 1 1 1 1", "1 −1 −1 1 1 −1 1 1 1" and "1 1 −1 −1 1 −1 1 1" which are sequentially phase shifted from a standard maximal-sequence code "1 −1 1 1 1 −1 −1 1" by 1 bit are supplied to the multiplier 2 in correspondence with each binary logic input data. The multiplier 2 first outputs a sequence code "−1 1 −1 1 1 1 −1" so as to write the sequence code into the registers 12 and 13 and the FIFO-memory 14. The multiplier 2 then outputs a sequence code "−1 −1 1 −1 1 1 1 1" so as to write the sequence code into the registers 12 and 13 and the FIFO-memory 14, thereby the content of the registers 12 and 13 and the FIFO-memory 14 becomes "−2 0 0 0 2 2 0". The multiplier 2 then outputs a sequence code "0 0 0 0 0 0 0" so as to write the sequence code into the registers 12 and 13 and the FIFO-memory 14, thereby the content of the registers 12 and 13 and the FIFO-memory 14 is "−2 0 0 0 2 2 0". The multiplier 2 finally outputs a sequence code "1 1 −1 −1 1 1 −1 1 1" so as to write the sequence code into the registers 12 and 13 and the FIFO-memory 14, thereby the content of the registers 12 and 13 and the FIFO-memory 14 becomes "−1 1 −1 −1 3 1 1".

(2) Operations for reading data out from the cyclic memory 1:

When data is to be read out from the cyclic memory 1 having two stages of registers 12 and 13 and $(2^n-3)$ stages FIFO-memory 14, only the corresponding data is regenerated by supplying the maximal-sequence code $m(t+j\Delta T)$ to the operation amplifier 31 as a control signal, the maximal-sequence code having phase shifting applied with the phase shifting quantity corresponding to the data to be read out, because the output data from the register 12 is supplied to the operation amplifier 31.

It is supposed that the content of the registers 12 and 13 and the FIFO-memory 14 is "−1 1 −1 −1 3 1 1" as shown in the above mentioned specific example.

The maximal-sequence code "0 1 0 1 1 1 0" which is phase shifted a standard maximal-sequence code with 1 bit is supplied to the operation amplifier 31 as the control signal. Then the following operations are sequentially performed.

$0-(-1)=1$ $1+1=2$ $2-(-1)=3$ $3+(-1)=2$ $2+3=5$ $5+1=6$ $6-1=5$

The uppermost bit "0" of the finally obtained value 5 is output from the register 32. The uppermost bit is supplied to the inverter 33 so as to convert to "1", thereby the original binery logic input data "1" is regenerated. The other binary logic input data are also regenerated by performing the similar operations based upon maximal-sequence codes which are phase shifted with 2 bits, 3 bits and 4 bits respectively.

In this embodiment, data can be input through the convolution bus 16 by controlling the bus buffer 15 disenable state. The bus buffer 15 can be provided at an outer side position with respect to the branch for feedback when the bus buffer 15 is a bidirectional bus buffer.

Second Embodiment

Figure 3:
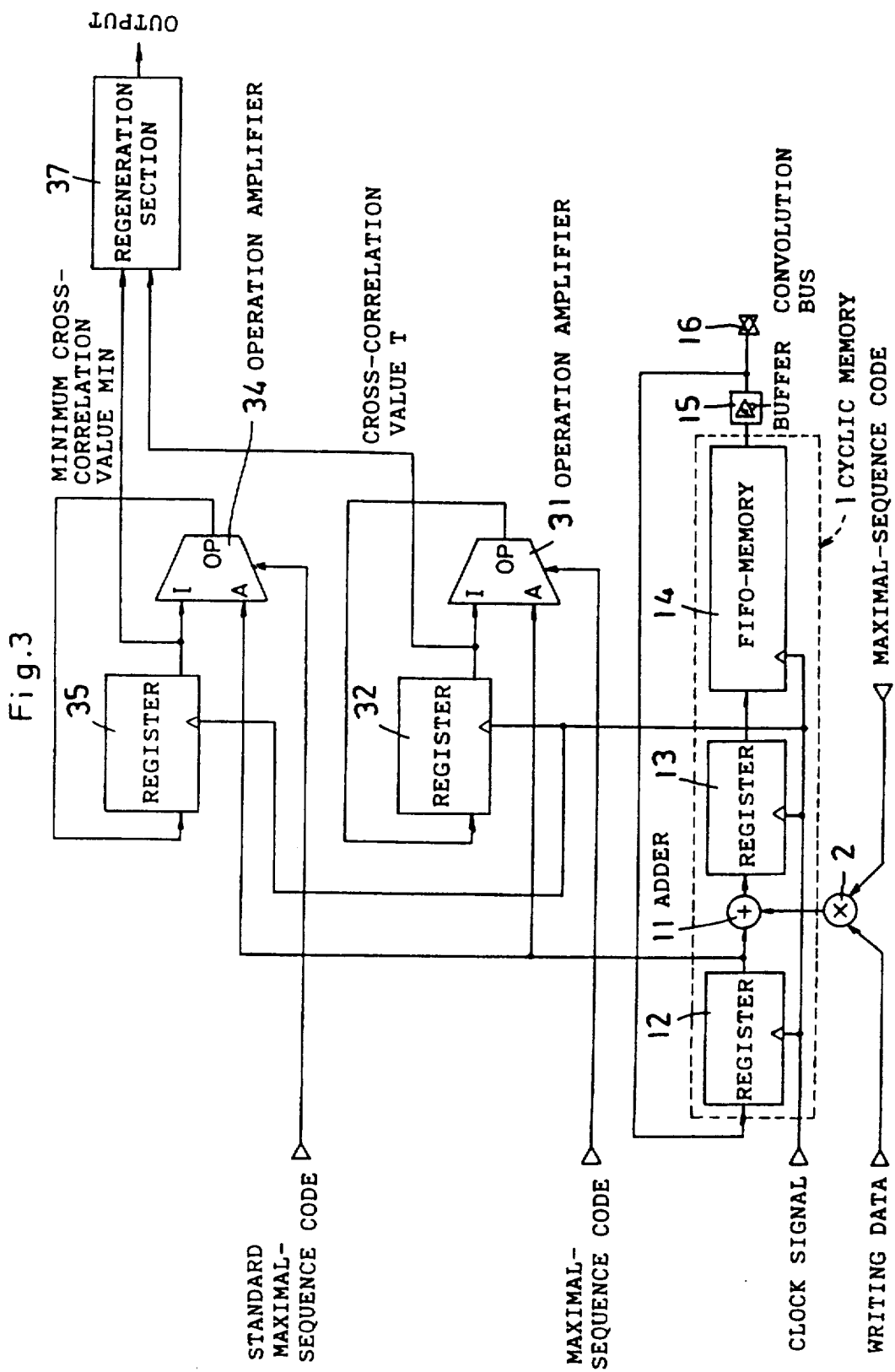
FIG. 3 is a block diagram of another embodiment of the memory access apparatus in accordance with the present invention.

FIG. 3 is a block diagram of another embodiment of the memory access apparatus in accordance with the present invention.

This embodiment differs from the first embodiment in that the standard maximal-sequence code modulated based upon standard data having a known value is convoluted to other modulated maximal-sequence codes and written into the registers 12 and 13 and the FIFO-memory 14. An operation amplifier 34 which is supplied with the standard maximal-sequence code as a control signal and a corresponding register 35 are provided. The inverter 33 is omitted and a regeneration section 37 to which contents of the registers 32 and 35 are supplied is provided.

The regeneration section 37 receives the cross-correlation value T output from the register 32 and the standard cross-correlation value output from the register 35 and performs predetermined operations. When the standard data is "0", the standard cross-correlation value becomes the minimum cross-correlation value min, then it is sufficient that operation of $2^{-3}$ (T-min) is performed. The data which is obtained by modulating the standard maximal-sequence code by the standard data is not actually required to be convoluted. Otherwise when the standard data is "1", the standard cross-correlation value becomes the maximum cross-correlation value max, then it is sufficient that operation of $2^{-3}$(max-T) is performed.

It is supposed that the standard data is "0", intermediate value data for writing are "0.5", "0.8" and "1" and maximal-sequence codes "$-1\ 1\ -1\ 1\ 1\ 1\ -1$", "$-1\ -1\ 1\ -1\ 1\ 1\ 1$", "$1\ -1\ -1\ 1\ -1\ 1\ 1$" and "$1\ 1\ -1\ -1\ 1\ -1\ 1$" which are sequentially phase shifted a standard maximal-sequence code "$1\ -1\ 1\ 1\ 1\ -1\ -1$" by 1 bit are assigned to each intermediate value data.

A sequence code "$-0.5\ 0.5\ -0.5\ 0.5\ 0.5\ 0.5\ -0.5$" is first written into the registers 12 and 13 and the FIFO-memory 14 based upon the first intermediate value data "0.5" and the maximal-sequence code "$-1\ 1\ -1\ 1\ 1\ 1\ -1$". A sequence code "$-0.8\ -0.8\ 0.8\ -0.8\ 0.8\ 0.8\ 0.8$" is then overwritten based upon the next intermediate value data "0.8" thereby a sequence code "$-1.3\ -0.3\ 0.3\ -0.3\ 1.3\ 1.3\ 0.3$" is held by the registers 12 and 13 and the FIFO-memory 14. A sequence code "$1\ -1\ -1\ 1\ -1\ 1\ 1$" is further overwritten based upon the data "1" thereby a sequence code "$-0.3\ -1.3\ -0.7\ 0.7\ 0.3\ 2.3\ 1.3$" is held by the registers 12 and 13 and the FIFO-memory 14.

The maximal-sequence code "0 1 0 1 1 1 0" is supplied to the operation amplifier 31 as the control signal. Then the following operations are sequentially performed based upon the data which are sequentially output from the register 12.

$0-(-0.3)=0.3$ $0.3+(-1.3)=-1.0$ $-1.0-(-0.7)=-0.3$ $-0.3+0.7=0.4$ $0.4+0.3=0.7$ $0.7+2.3=3.0$ $3.0-1.3=1.7$

The finally obtained value 1.7 is supplied to the regeneration section 37 as the cross-correlation value T.

The maximal-sequence code "1 0 1 1 1 0 0" is supplied to the operation amplifier 34 as the control signal. Then the following operations are sequentially performed.

$0+(-0.3)=-0.3$ $-0.3-(-1.3)=1.0$ $1.0+(-0.7)=0.3$ $0.3+0.7=1.0$ $1.0+0.3=1.3$ $1.3-2.3=-1.0$ $-1.0-1.3=-2.3$

The finally obtained value $-2.3$ is supplied to the regeneration section 37 as the minimum cross-correlation value min. Then the regeneration section 37 performs the operation $2^{-3}\{1.7-(-2.3)\}$ and obtains the original intermediate value "0.5". The other intermediate values are also regenerated by performing the similar operations based upon maximal-sequence codes, each maximal-sequence code corresponding to each intermediate value.

When the data held in the registers 12 and 13 and the FIFO-memory 14 is to be renewed, for example the above intermediate value "0.5" is to be renewed, it is sufficient that the difference value "0.2" and the same maximal-sequence code "$-1\ 1\ -1\ 1\ 1\ 1\ -1$" are supplied to the multiplier 2. As is apparent from the foregoing, the original data is not required to be erased, thereby the renewal of data can be simplified.

Third Embodiment

Figure 4:
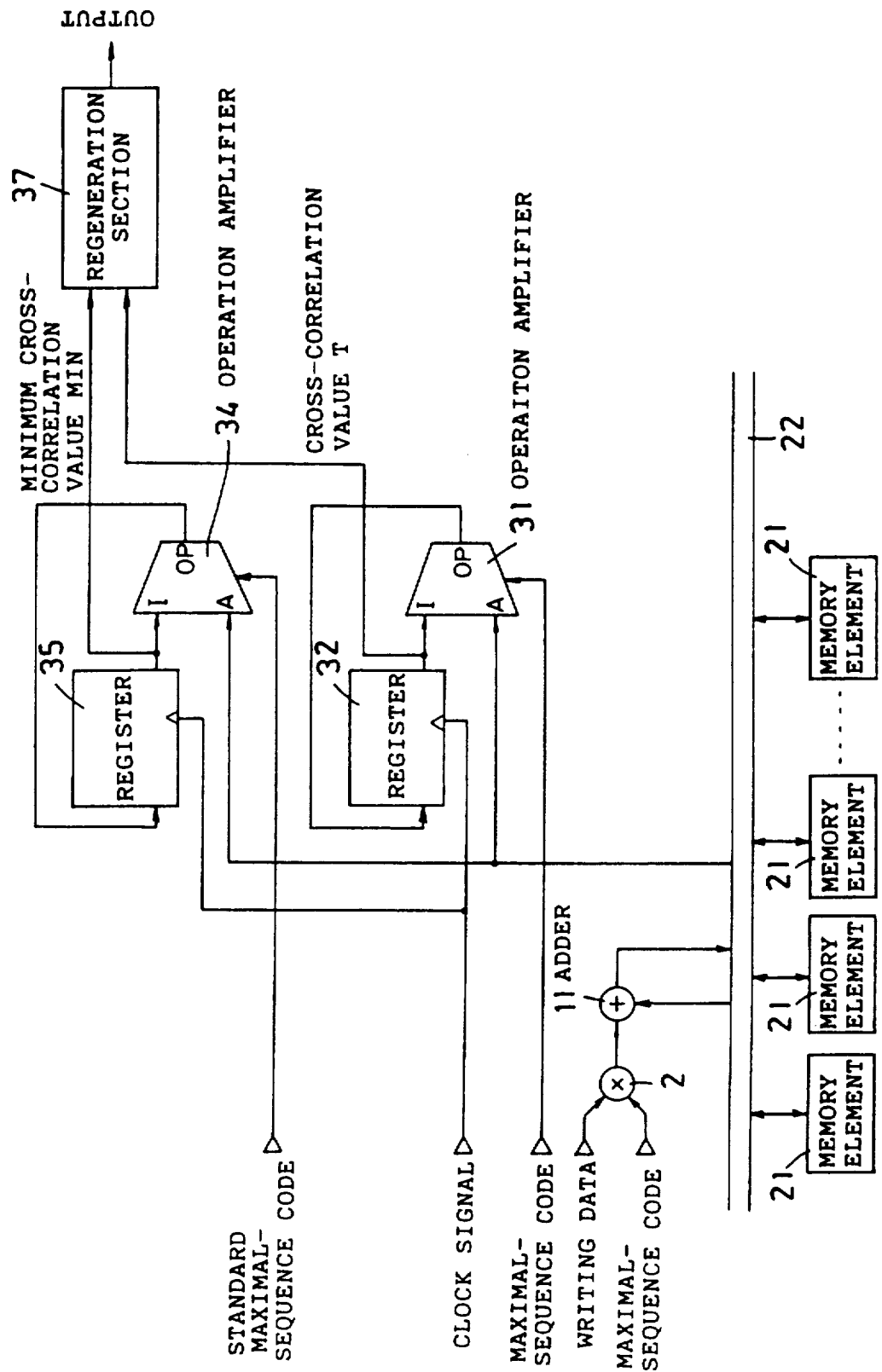

FIG. 4 is a block diagram of a further embodiment of the memory access apparatus in accordance with the present invention.

This embodiment differs from the second embodiment in that a ($2^n-1$)-number of memory elements 21 are connected to a data bus 22 instead of serially connecting the registers 12 and 13 and the FIFO-memory 14, data is read out from and written into the memory elements 21 through the data bus 22, read out data through the data bus 22 is supplied to the adder 11 which also is supplied with the output data from the multiplier 2, and the output data from the adder 11 is written into the memory elements 21 by means of the data bus 22.

The memory elements 21 substantially constitute a cyclic memory because read out access and write into access are sequentially performed for each individual memory element 21 through the data bus 22.

In this embodiment, when any one or more of the memory elements are destroyed, only the destroyed memory elements are impossible to access while the other memory elements are accessable. And one data is not held in only one memory element but is held in the plural memory element in a diffused manner. As a result, when the memory elements are partially destroyed, data can be written into the memory elements and data can be read out from the memory elements with fairly high accuracy.

Fourth Embodiment

FIG. 5 is a block diagram of still another embodiment of the memory access apparatus in accordance with the present invention.

This embodiment differs from the second embodiment in that a read out access apparatus consists of a multipler 41, an adder 42 and a register 43.

The output data from the register 12 and a sequence code which is obtained based upon the difference of a maximal-sequence code corresponding to reading out data and the standard maximal-sequence code are supplied to the multiplier 41. The output data from the multiplier 41 are output to an exterior apparatus through the adder 42 and the register 43. The output data from the register 43 are also fed back to the adder 42.

As is apparent from the foregoing, the arrangement of the memory access apparatus is more simplified.

Operations of the read out access apparatus are as follows.

It is supposed that the standard maximal-sequence code is "−1 1 1 1 −1 −1 1", a standard data Z1 and multiple value data Z2, Z3 and Z4 which are already written are "0", "0.5", "0.8" and "1" respectively.

Convoluted data Sj (where j=1, 2, . . . 7) of "2.3 0.3 −1.3 −0.3 −0.7 0.7 1.3" are sequentially output from the register 12. As to the regeneration data R2, R3 and R4 to be regenerated based upon the convoluted data and maximal-sequence codes m1j, m2j, m3j and m4j corresponding to the standard data R1 and the regeneration data R2, R3 and R4 respectively, the regeneration data R2, R3 and R4 are unknown, the standard data R1 is 0 and the maximal-sequence codes m1j, m2j, m3j and m4j are represented as follows.

$$m1j = \text{"}-1\ 1\ 1\ 1\ -1\ -1\ 1\text{"}$$

$$m2j = \text{"}1\ 1\ 1\ -1\ -1\ 1\ -1\text{"}$$

$$m3j = \text{"}1\ 1\ -1\ -1\ 1\ -1\ 1\text{"}$$

$$m4j = \text{"}1\ -1\ -1\ 1\ -1\ 1\ 1\text{"}$$

The unknown regeneration data Ri are represented by the equation $$Ri = 2^{-3}\left(\sum_{j=1}^{7} Sj \cdot mij - \sum_{j=1}^{7} Sj \cdot m1j\right)$$

$$= (1/8)\sum_{j=1}^{7} Sj(mij - m1j).$$

The code m2j-m1j is "2 0 0 −2 0 2 −2", the code m3j-m1j is "2 0 −2 −2 2 0 0", the code m4j-m1j is "2 −2 −2 0 0 2 0", the code Sj(m2j-m1j) is "4.6 0.0 0.0 0.6 0.0 1.4 −2.6", the code Sj(m3j-m1j) is "4.6 0.0 2.6 0.6 −1.4 0.0 0.0", the code Sj(m4j-m1j) is "4.6 −0.6 2.6 0.0 0.0 1.4 0.0". Then the regeneration data R2, R3 and R4 are obtained by the following equations.

$$R2 = (4.6 + 0.6 + 1.4 - 2.6)/8 = 0.5$$

$$R3 = (4.6 + 2.6 + 0.6 - 1.4)/8 = 0.8$$

$$R4 = (4.6 - 0.6 + 2.6 + 1.4)/8 = 1.0$$

As a result, the regeneration data R2, R3 and R4 coincide with the multiple value data Z2, Z3 and Z4.

Fifth Embodiment

Figure 6A:
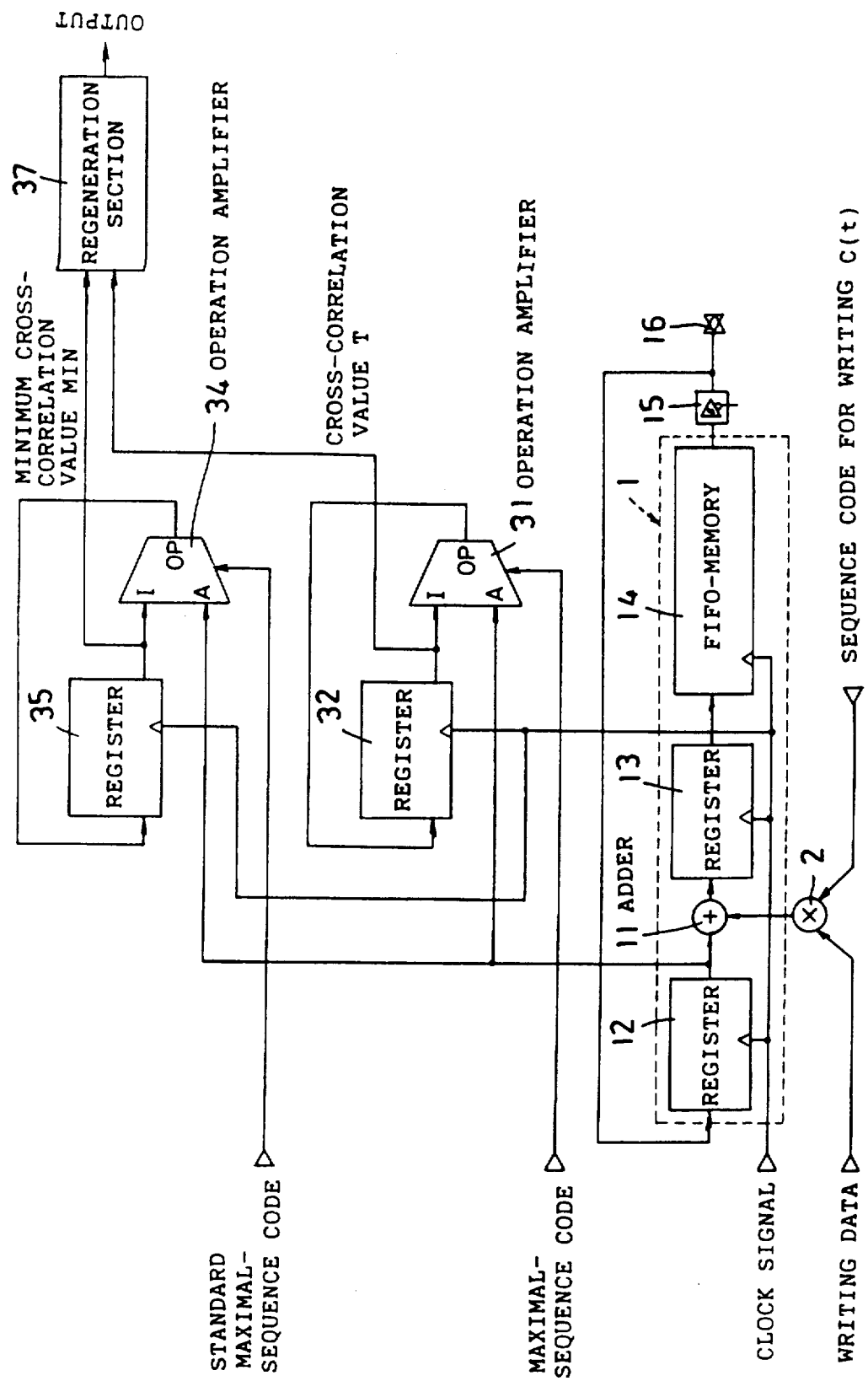
Figure 6B:
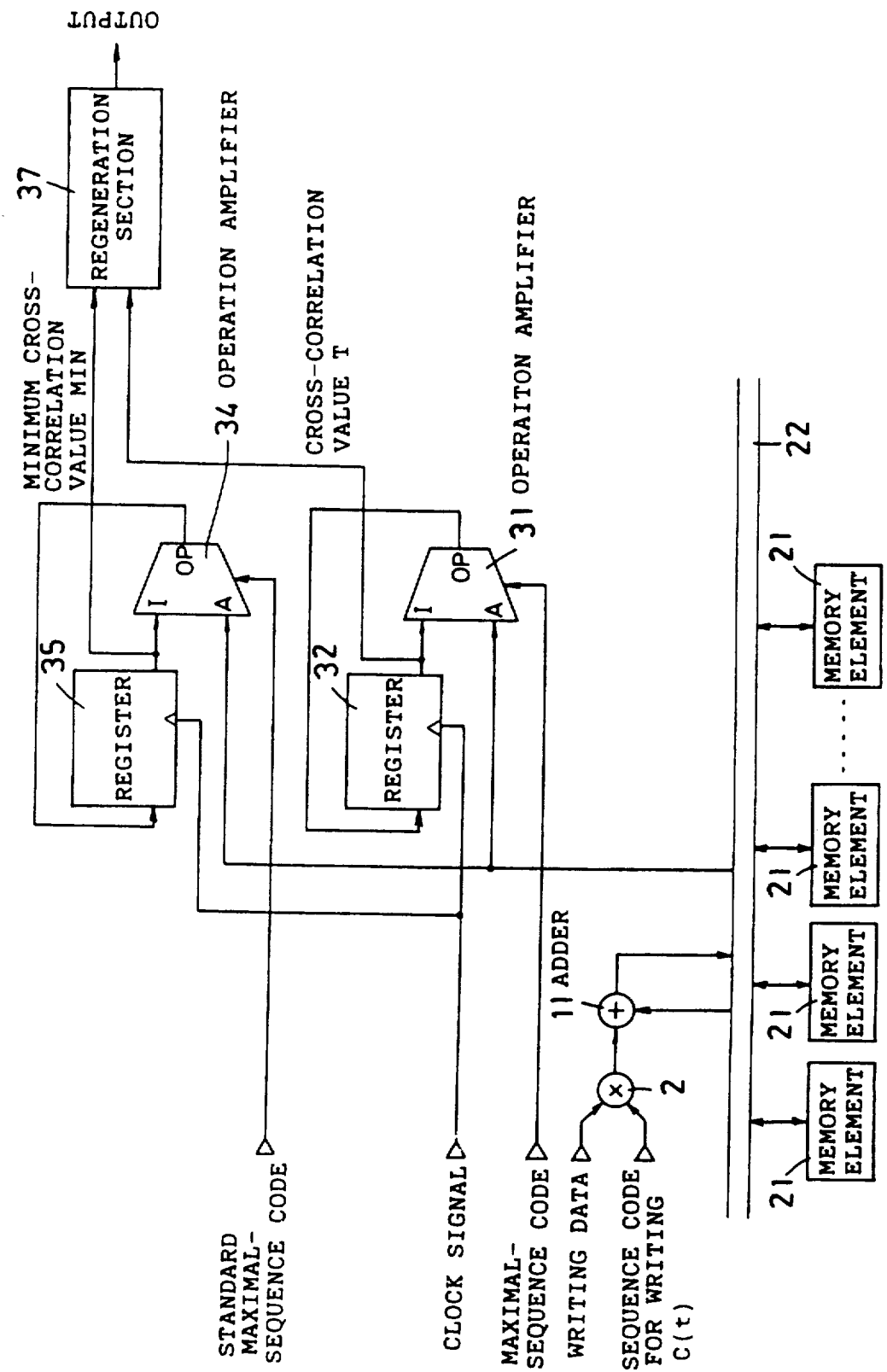
Figure 6C:
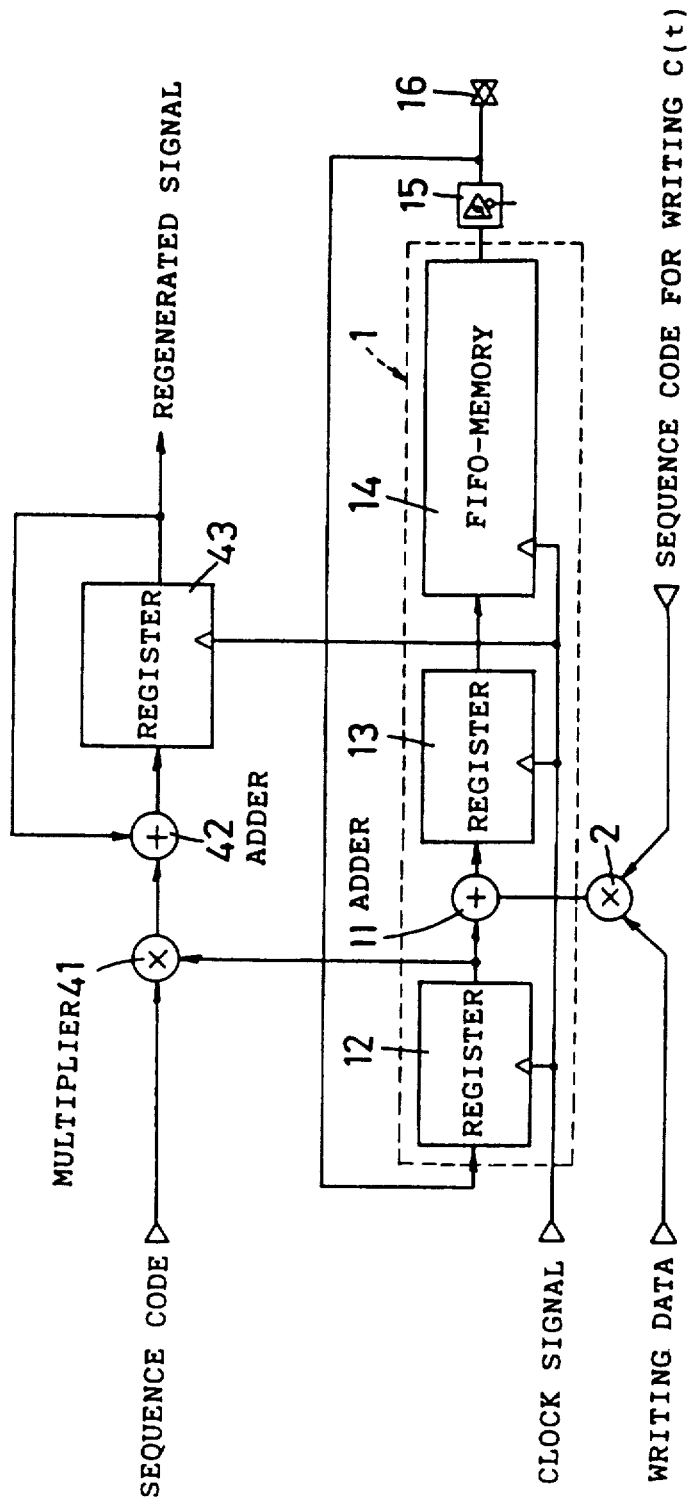

FIGS. 6-A, 6-B and 6-C are block diagrams of yet other embodiments of the memory access apparatus in accordance with the present invention. These block diagrams correspond to the embodiments shown in FIGS. 3, 4 and 5 respectively.

The embodiments shown in FIGS. 6-A, 6-B and 6-C differ from the embodiments shown in FIGS. 3, 4 and 5 in that a sequence code for writing $$C(t) = \sum_{j=1}^{L} wj \cdot m(t + j\Delta T)$$

is supplied to the multiplier 2 instead of the maximal-sequence code m(t+jΔT), the sequence code for writing being obtained based upon desired weighting factors wj and the maximal-sequence code m(t+jΔT). The weighting factor w0 is determined to 0.

In these embodiments, when plural data X1, x2, . . . xL are written into the cyclic memory 1 based upon the maximal-sequence codes having the phase shifting quantities which are the same as the foregoing embodiments, the plural data are written into the cyclic memory 1 in a form of w1x1+w2x2+ . . . +wLxL instead of the form x1+x2+ . . . +xL. As is apparent from the foregoing, previously multiplying the weighting factors and the plural data is not needed, thereby memory access for writing is simplified.

These embodiments are applicable to an input layer of a studying type neural network. In the studying type neural network, it is necessary that weighting factors change based upon the results of studying, therefore these embodiments are applicable to store sequence codes and bus output of each layer which are obtained by studying and the like.

Sixth Embodiment

Figure 7A:
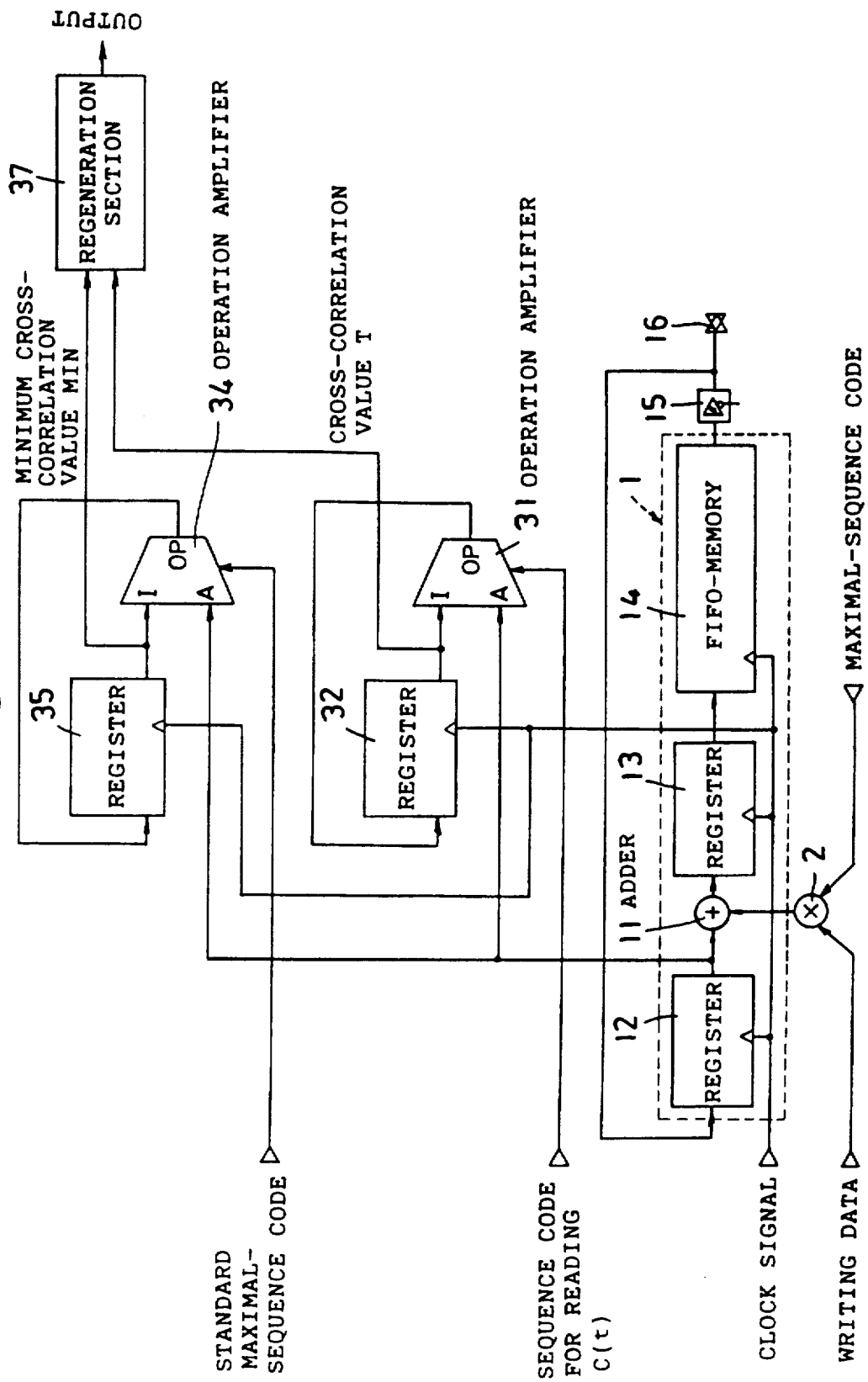
Figure 8:
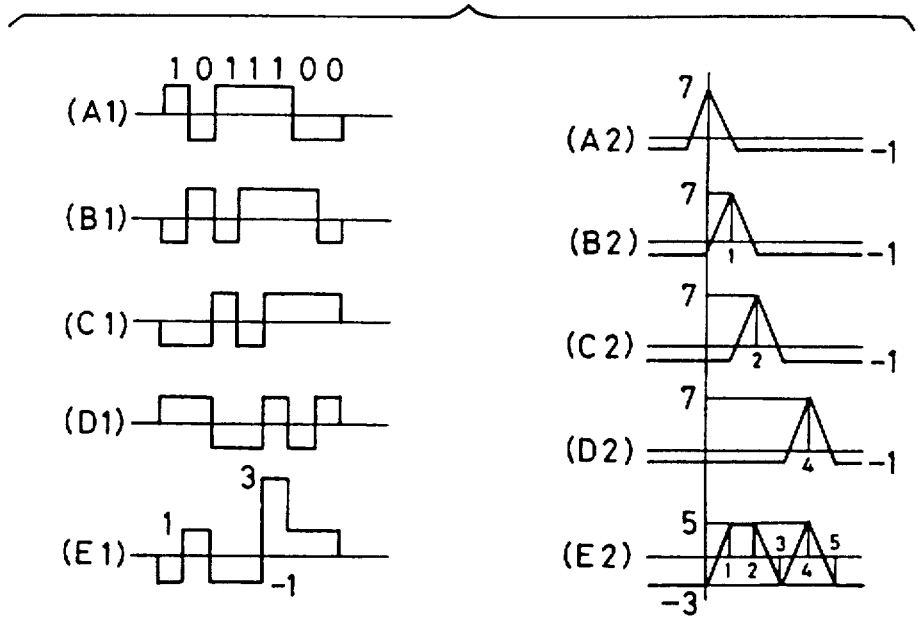
FIGS. 8(A1) through 8(E1) and 8(A2) through 8(E2) are diagrams useful for explaining newly found characteristics of a maximal-sequence code.
Figure 9:
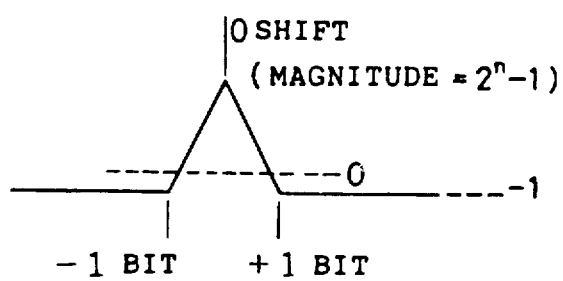
FIG. 9 is a diagram useful for explaining widely known characteristics of a maximal-sequence code.

FIGS. 7-A, 7-B and 7-C are block diagrams of still further embodiments of the memory access apparatus in accordance with the present invention. These block diagrams correspond to embodiments shown in FIGS. 3, 4 and 5 respectively.

The embodiments shown in FIGS. 7-A, 7-B and 7-C differ from the embodiments shown in FIGS. 3, 4 and 5 in that a sequence code for reading $$C(t) = \sum_{j=1}^{L} wj \cdot m(t + j\Delta T)$$

or a sequence code for reading $$Cr(t) = \sum_{j=1}^{L} wj(mij - m1j)$$

is supplied to the operation amplifier 31 and the multiplier 41 instead of the maximal-sequence code $m(t+j\Delta T)$ or the sequence code (mij-mlj), the sequence code for writing $$C(t) = \sum_{j=1}^{L} wj \cdot m(t + j\Delta T)$$

being obtained based upon desired weighting factors wj and the maximal-sequence code $m(t+j\Delta T)$ and the sequence code for writing $$Ci'(t) = \sum_{j=1}^{L} wj(mij - mlj)$$

being obtained based upon desired weighting factors wj and the sequence code (mij-mlj). The weighting factor w0 is determined to 0.

When the sequence code for writing C'(t) is supplied, the cross-correlation value $$\beta(t) = \sum_{k=1}^{2^n-1} S(t + k\Delta T).$$

$C(t+k\Delta T)$ is obtained based upon the convoluted read out data $$S(t) = \sum_{j=1}^{L} xj \cdot m(t + j\Delta T)$$

and the sequence code for reading C(t) and the cross-correlation value min corresponding to the "0" level is also obtained. Then, the output value X which is equivalent to each data includes the weighting factor therein by performing, for example, the operation of $$X = 2^{-n}\left(\beta(t) - \min \sum_{j=1}^{L} wj\right)$$

with the regeneration section 37.

When the sequence code for writing Ci'(t) is supplied, that is a sum $\delta = w2Z2 + w3Z3 + w4Z4$ of signals which are obtained by multiplying the weighting factors w2, w3 and w4 to the multiple value data Z2, Z3 and Z4 is to be obtained, the sum $\delta$ is obtained by obtaining the cross-correlation value $$\delta = \sum_{j=1}^{7} Sj \cdot Cj$$

based upon a previously obtained sequence code $$Cj = (1/2^n) \sum_{i=2}^{4} \{wi(mij - mlj)\}$$

because the sum $\delta$ is generally represented by the equation $$\begin{aligned}
\delta &= \sum_{i=2}^{4} wi \cdot Ri \\
&= \sum_{i=2}^{4} \left[(1/2^n)\left(\sum_{j=1}^{L} Sj(mij - mlj)wi\right)\right] \\
&= (1/2^n) \sum_{i=2}^{4} \sum_{j=1}^{L} \{Sj(mij - mlj)wi\} \\
&= (1/2^n) \sum_{j=1}^{L} \left[Sj \sum_{i=2}^{4} \{wi(mij - mlj)\}\right].
\end{aligned}$$

The weighting factor w1 always has a value 0 corresponding to a standard signal channel.

It is supposed that the weighting factors w2, w3 and w4 are 1.0, 2.5 and −1.5 respectively, a code w1(mlj-mlj) is "0 0 0 0 0 0 0", a code w2(m2j-m1j) is "2 0 0 −2 0 2 −2", a code w3(m3j-m1j) is "5 0 −5 −5 5 0 0" and a code w4(m4j-m1j) is "−3 3 3 0 0 −3 0", then the sequence code $$Cj = (1/8) \sum_{i=2}^{4} \{wi(mij - mlj)\}$$

is "0.5 0.375 −0.25 −0.875 0.625 −0.125 −0.25". Further, the code Sj·Cj is "1.15 0.1125 0.325 0.2625 −0.4375 −0.0875 −0.325", then the sum $$\delta = \sum_{j=1}^{7} Sj \cdot Cj$$

is 1.0. The sum $\delta$ coincides with a sum calculated by the equation of $\delta = w2R2 + w3R3 + w4R4$.

As is apparent from the foregoing, the sum $\delta$ including the weighting factors wi is easily obtained without calculating the minimum cross-correlation value min by previously obtaining the sequence code $$Cj = (1/2^n) \sum_{i=2}^{4} \{wi(mij - mlj)\}$$

and supplying the sequence code Cj to the operation amplifier 34.

These embodiments are also applicable to the studying type neural network.

The memory access apparatus according to the present invention is not limited to the embodiments mentioned above. The memory access apparatus may perform writing and reading data using pseudo noise having significant auto-correlation characteristics other than the maximal-sequence code, for example random numbers, a balowa-sequence code and the like. Further, a sequence code for writing and for reading may be obtained using these sequence codes. Furthermore, when the memory access apparatus is applied to writing and reading multiple value data, an arbitrary value within the range of 0–1 may be employed as a standard data.

The terms and expressions which have been employed are used as terms of description and not of limitations, and there is no intention, in the use of such terms and expressions of excluding equivalents of the features shown and described, or portions thereof, it being recognized that various modifications are possible within the scope of the invention as claimed.

What is claimed is:

1. A method of regenerating data comprising the steps of:
   obtaining plural pseudo noises for writing by applying phase shifting to a pseudo noise which has significant auto-correlation characteristics, each pseudo noise for writing being phase shifted by an individual quantity;
   modulating each pseudo noise for writing based upon plural data to obtain modulated pseudo noises;
   writing modulated pseudo noises into a cyclic memory means which has a capacity corresponding to a code length of the pseudo noises;
   reading out the modulated pseudo noises from said cyclic memory means; and
   regenerating original data by obtaining a cross-correlation value between the modulated pseudo noises read out from said cyclic memory means and a pseudo noise phase shifted by a quantity corresponding to the individual quantity.

2. A method of regenerating data as set forth in claim 1, wherein the plural data to be rewritten are differences between new writing data and data already written in the cyclic memory means when the new writing data are to be written into the cyclic memory means.

3. A method of regenerating data as set forth in claim 1, wherein the pseudo noise is a maximal-sequence code which has a code length longer than a total length of the plural data.

4. A method of regenerating data as set forth in claim 1, wherein the plural data include a standard data and intermediate value data and the original data other than the standard data is regenerated based upon the regenerated standard data.

5. A method of regenerating data comprising the steps of:
   obtaining plural pseudo noises for writing by applying phase shifting to a pseudo noise which has significant auto-correlation characteristics, each pseudo noise for writing being phase shifted by an individual quantity;
   modulating each pseudo noise for writing based upon the plural data to obtain modulated pseudo noises;
   writing the modulated pseudo noises into a cyclic memory means which has a capacity corresponding to a code length of the pseudo noises;
   reading out the modulated pseudo noises from said cyclic memory means; and
   obtaining weighted data by obtaining a cross-correlation value between the modulated pseudo noises read out from said cyclic memory means and a time sequence code which is obtained based upon weighting factors for the data and the plural pseudo noises.

6. A method of regenerating data as set forth in claim 5, wherein the plural data to be rewritten are differences between new writing data and data already written in said cyclic memory means when the new writing data are to be written into said cyclic memory means.

7. A method of regenerating data as set forth in claim 5, wherein the pseudo noise is a maximal-sequence code which has a code length longer than a total length of the plural data.

8. A method of regenerating data as set forth in claim 5, wherein the plural data include a standard data and intermediate value data and the weighted data other than the weighted standard data is obtained based upon the obtained weighted standard data.

9. A method of regenerating data comprising the steps of:
   obtaining plural pseudo noises by applying phase shifting to a pseudo noise which has significant auto-correlation characteristics, each pseudo noise being phase shifted by an individual quantity;
   obtaining a time sequence code based upon weighting factors for plural data and the plural pseudo noises;
   modulating the time sequence code based upon the plural data to obtain modulated time sequence codes;
   writing the modulated time sequence codes into a cyclic memory means which has a capacity corresponding to a code length of the pseudo noise;
   reading out the modulated time sequence codes from said cyclic memory means; and
   obtaining weighted data by obtaining a cross-correlation value of the modulated time sequence codes read out from said cyclic memory means and a pseudo noise phase shifted by a quantity corresponding to the individual quantity.

10. A method of regenerating data as set forth in claim 9, wherein the plural data to be rewritten are differences between new writing data and data already written in said cyclic memory means when the new writing data are to be written into said cyclic memory means.

11. A method of regenerating data method as set forth in claim 9, wherein the pseudo noise is a maximal-sequence code which has a code length longer than a total length of the plural data.

12. A method of regenerating data method as set forth in claim 9, wherein the plural data include a standard data and intermediate value data and the weighted data other than the standard data is obtained based upon the regenerated standard data.

13. A method of regenerating data as set forth in claim 9, wherein the plural data include a standard data and intermediate value data and the method further comprises the step of obtaining weighted data other than the weighted standard data based upon the obtained weighted standard data.

14. A data regeneration apparatus comprising:
    pseudo noise generating means for generating plural pseudo noises for writing based upon a pseudo noise having significant auto-correlation characteristics, said plural pseudo noises for writing being phase shifted by individual quantities;
    modulation means for modulating said plural pseudo noises for writing based upon plural data to provide modulated pseudo noises;
    convolution means for convoluting said modulated pseudo noises to provide convoluted signal data;
    cyclic memory means for sequentially storing said convoluted signal data, said cyclic memory means having a capacity corresponding to a code length of said pseudo noise;
    read out means for reading out said convoluted signal data from said cyclic memory means;
    cross-correlation means for obtaining a cross-correlation value between said convoluted signal data read out from said cyclic memory means and said pseudo noise phase shifted by quantities corresponding to said individual quantities; and
    regeneration means for regenerationg said plural data based upon said cross-correlation value.

15. A memory access apparatus as set forth in claim 14, wherein said convolution means convolutes data to the convoluted signal data already written in said cyclic memory means.

16. A memory access apparatus as set forth in claim 14, wherein said pseudo noise is a maximal-sequence code which has a code length longer than a total length of said plural data.

17. A memory access apparatus as set forth in claim 14, wherein said plural data include a standard data and intermediate value data and said regeneration means includes restoration means for restoring data other than the standard data based upon the regenerated standard data.

18. A memory access apparatus as set forth in claim 14, wherein said cyclic memory means includes two stages of registers, an adder interposed therebetween and plural stages of first-in first-out memory.

19. A data regeneration apparatus as set forth in claim 14, wherein said cross-correlation means includes a register, an operational amplifier for performing predetermined operations based upon the content of said register, the received data and a maximal-sequence code to obtain operation results and for supplying the operation result to said register, and said regeneration means is an inverter for outputting regeneration data based upon the uppermost digit of said register.

20. A data regeneration apparatus as set forth in claim 14, wherein said cross-correlation means includes a multiplier for multiplying said pseudo noise phase shifted by quantities corresponding to said individual quantities with read out pseudo noise, an adder and a register, wherein output data from said adder is supplied to said register and output data from said register is output as regeneration data and is supplied to said adder together with output data from said multiplier.

21. A data regeneration apparatus comprising;
pseudo noise generating means for generating plural pseudo noises for writing based upon a pseudo noise having significant auto-correlation characteristics, said plural pseudo noises for writing being phase shifted by individual quantities;
modulation means for modulating said plural pseudo noises for writing based upon plural data to provide modulated pseudo noises;
convolution means for convoluting said modulated pseudo noises to provide convoluted signal data;
cyclic memory means for sequentially storing said convoluted signal data, said cyclic memory means having a capacity corresponding to a code length of said pseudo noise;
read out means for reading out said convoluted signal data from said cyclic memory means;
cross-correlation means for obtaining a cross-correlation value between said convoluted signal data read out from said cyclic memory means and a time sequence code which is obtained based upon weighting factors for data and said plural pseudo noises, and
generation means for generating plural weighted data based upon said cross-correlation value.

22. A data regeneration apparatus as set forth in claim 21, wherein said convolution means further convolutes data to the convoluted signal data already written in said cyclic memory means.

23. A data regeneration apparatus as set forth in claim 21, wherein said pseudo noise is a maximal-sequence code which has a code length longer than a total length of said plural data.

24. A data regeneration apparatus as set forth in claim 21, wherein said plural data include a standard data and and intermediate value data and said generation means includes restoration means for restoring data other than the standard data based upon the regenerated standard data.

25. A data regeneration apparatus as set forth in claim 21, wherein said cyclic memory means includes two stages of registers, an adder interposed therebetween and plural stages of first-in first-out memory.

26. A data regeneration apparatus as set forth in claim 21, wherein said cross-correlation means includes a register, and an operational amplifier for performing predetermined operations based on the content of said register, the received data and a maximal-sequence code to obtain operation results and for supplying the operation result to said register.

27. A data regeneration apparatus as set forth in claim 21, wherein said cross-correlation means includes a multiplier for multiplying said pseudo noise phase shifted by quantities corresponding to said individual quantities with read out pseudo noise, an adder and a register, wherein output data from said adder is supplied to said register and output data from said register is output as regeneration data and is supplied to said adder together with output data from said multiplier.

28. A data regeneration apparatus comprising;
pseudo noise generating means for generating plural pseudo noises based upon a pseudo noise having significant auto-correlation characteristics, said plural pseudo noises being phase shifted by individual quantities;
time sequence code generating means for generating a time sequence code based upon weighting factors for data which is to be stored and said pseudo noises;
modulation means for modulating said time sequence code based upon plural data which are to be stored to provide modulated time sequence codes;
convolution means for convoluting said modulated time sequence codes to provide convoluted signal data;
cyclic memory means for sequentially storing said convoluted signal data, said cyclic memory means having a capacity corresponding to a code length of said pseudo noise;
read out means for reading out said convoluted signal data from said cyclic memory means;
cross-correlation means for obtaining a cross-correlation value between said convoluted signal data read out from said cyclic memory means and pseudo noise being phase shifted by a quantity corresponding to said individual quantity, and
generation means for generating plural weighted data based upon said cross-correlation value.

29. A data regeneration apparatus as set forth in claim 28, wherein said convolution means convolutes data to the convoluted signal data already written in said cyclic memory means.

30. A data regeneration apparatus as set forth in claim 28, wherein said pseudo noise is a maximal-sequence code which has a code length longer than a total length of said plural data.

31. A data regeneration apparatus as set forth in claim 28, wherein said plural data include a standard data and intermediate value data and said generation means includes restoration means for restoring data other than the standard data based upon the regenerated standard data.

32. A data regeneration apparatus as set forth in claim 28, wherein said cyclic memory means includes two stages of registers, an adder interposed therebetween and plural stages of first-in first-out memory.

33. A data regeneration apparatus as set forth in claim 28, wherein said cross-correlation means includes a register, and an operational amplifier for performing predetermined operations based on the content of said register, the received data and a maximal-sequence code to obtain operation results and for supplying the operation result to said register.

34. A data regeneration apparatus as set forth in claim 28, wherein said cross-correlation means includes a multiplier for multiplying said pseudo noise phase shifted by quantities corresponding to said individual quantities with read out pseudo noise, an adder and a register, wherein output data from said adder is supplied to said register and output data from said register is output as regeneration data and is supplied to said adder together with output data from said multiplier.

* * * * *